Patented May 27, 1924.

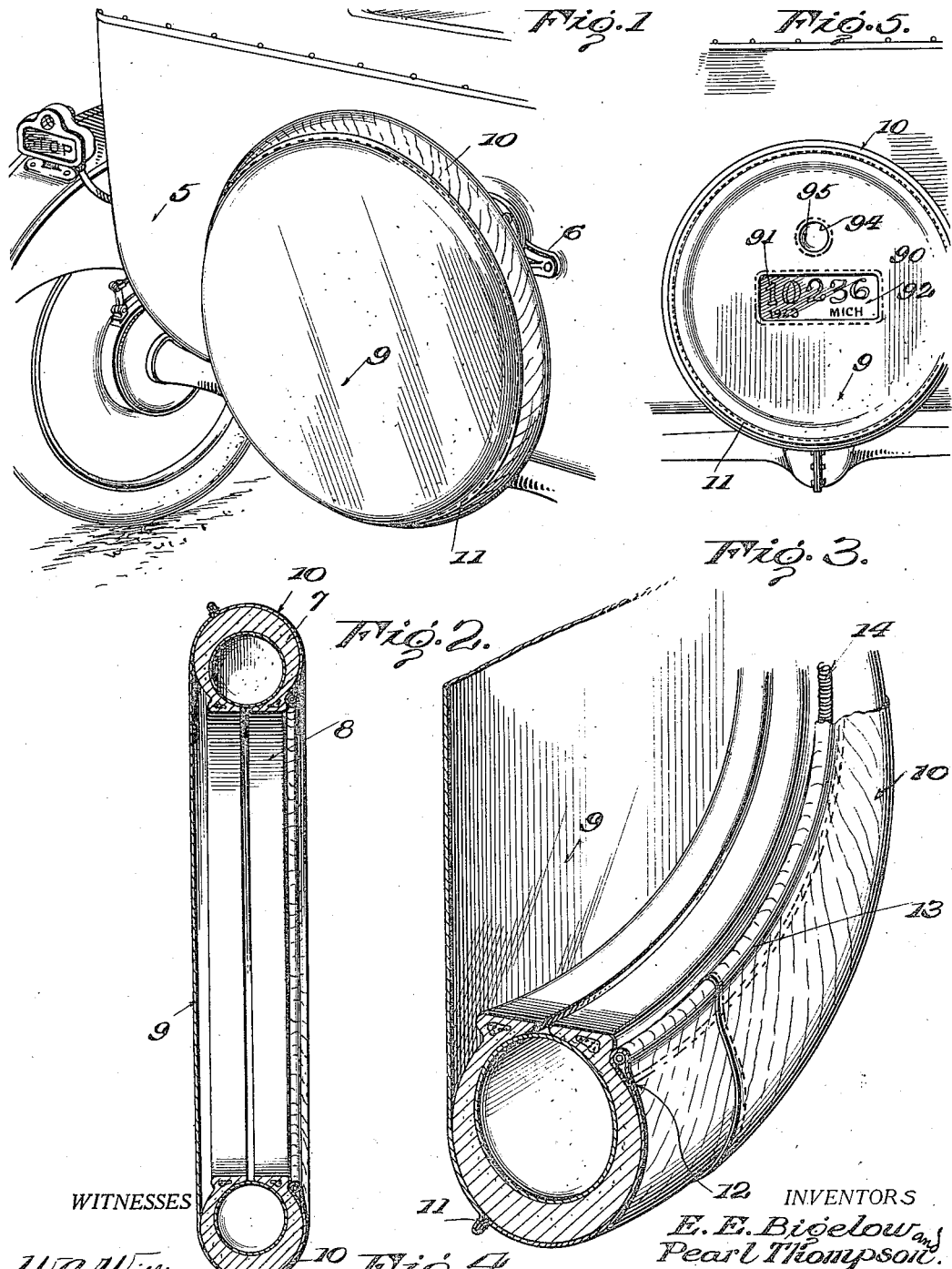

1,495,665

UNITED STATES PATENT OFFICE.

EUGENE EDWIN BIGELOW AND PEARL THOMPSON, OF PONTIAC, MICHIGAN.

TIRE COVER.

Application filed June 21, 1923. Serial No. 646,855.

*To all whom it may concern:*

Be it known that we, EUGENE E. BIGELOW and PEARL THOMPSON, citizens of the United States, and residents of Pontiac, in the county of Oakland and State of Michigan, have invented certain new and useful Improvements in Tire Covers, of which the following is a specification.

This invention relates to coverings especially adapted for use on automobile tires.

Briefly stated an important object of the invention is to provide a tire cover which may be instantly applied to a tire on a rack or removed without applying or removing nuts, bolts or other fastening devices.

A further object is to provide a tire cover having an attaching band cut on the bias so that when the cover is applied the attaching band and body of the cover will be absolutely smooth and free from objectionable and dust collecting wrinkles or folds.

A further object is to provide a tire cover which is of highly simplified construction, durable in use and cheap to manufacture.

Other objects and advantages will be apparent during the course of the following description.

In the accompanying drawing forming a part of this application and in which like numerals are employed to designate like parts throughout the same, Figure 1 is a perspective of the improved tire cover applied.

Figure 2 is a vertical transverse sectional view through the improved tire cover.

Figure 3 is a fragmentary sectional perspective of the tire cover applied, the view illustrating the fact that the tire cover is free from objectionable dust collecting folds or pleats.

Figure 4 is a fragmentary plan view of the attaching band embodied in the invention, which attaching band is cut on the bias.

Figure 5 is an elevation illustrating a slightly modified form of invention.

In the drawing the numeral 5 designates a vehicle having a tire rack 6 of any desired construction and the tire rack may support a tire 7 having beads 8.

The invention forming the subject matter of this application resides in a cover consisting of a circular or disk-shaped body 9, an attaching band 10 and in the means for securing the cover in position so that the same will be free from objectionable dust collecting folds and so that the same will be extremely neat in appearance.

The circular or disk-shaped body 9 is formed from imitation leather, real leather, canvas or any other material and as illustrated in Figures 2 and 3 it has its edge portion secured by stitching 11 to the outer edge of the attaching band or strip 10.

The inner edge of the attaching strip 10 is folded and stitched as indicated at 12 to define a hem 13 adapted for the reception of a coiled spring 14. The convolutions of the coiled spring 14 are close together and therefore form a means for uniformly drawing the inner edge of the attaching band inwardly.

In manufacture the attaching band 10 is cut on the bias so that when the cover is applied the same will snugly hug the tire and be devoid of objectionable folds and pockets. The ends of the attaching band 10 are allowed to remain entirely free as illustrated in Figure 3 and the same are overlapped to exclude dust and at the same time to allow any water which may collect in the cover to drain.

The improved tire cover may be made for tires of various sizes and to apply the cover it is merely necessary to slightly stretch the coiled spring and slip the band over the crown of the tire, as illustrated in Figure 2 whereupon the attaching band or strip 10 will lie flatly in contact with the tire and be free from objectionable creases which would greatly shorten the life of the cover because if the material happened to be imitation leather or the like it would soon crack. By this invention, cracking of the material is absolutely overcome. This is especially true of the flat body 9 which as illustrated in Fig. 1 is alsolutely free from all creases and folds.

An actual working model of the invention illustrates that the same may be instantly applied to a tire on a rack without unusual skill and without inconvenience.

In carrying out the invention the cover may be wide enough to accommodate a plurality of tires. Furthermore the cover may be applied without removing or applying bolts or other fastening devices and when in position the cover adds greatly to the appearance of the vehicle. By cutting the material on the bias for the strip 10 the transverse curvature of the crown of the tire is well provided for.

When it is desired to remove the cover this may be instantly done by merely slipping the band 10 over the crown of the tire. No fastening straps, bolts or the like need be removed as the coiled spring constitutes the sole fastening means for the cover and this may be quickly expanded or increased in length simultaneously with the removal of the tire.

If desired, the center of the flexible body 9 may be provided with a sight opening 91 to afford a clear view of a license plate 92 which may be located within the plane of the tire and which may be carried by the tire rack. Also a second opening 94 may be located in the body 9 to afford a view of the tail light 95.

The foregoing illustrates that a tire cover constructed in accordance with this invention may be quickly and economically manufactured and applied to a tire and when in position the cover will greatly protect and prolong the life of a spare tire.

Attention is especially directed to the fact that the spring 14 not only forms a reliable means for holding the cover in place, but also holds the free overlapped ends of the strip 10 flatly in contact with each other. It is thus seen that this dual function performed by the spring adds greatly to the utility and appearance of the cover.

It is to be understood that the forms of the invention herewith shown and described are to be taken merely as preferred examples of the same and that such minor changes in arrangement and construction of parts may be made as will remain within the spirit of the invention and the scope of what is claimed.

Having thus described the invention, what is claimed is:—

1. As an article of manufacture, a tire cover comprising a disk-shaped piece of flexible material, an attaching strip connected at its outer edge to the edge portion of said piece of material, said attaching strip being cut on the bias whereby the same will accommodate itself to the transverse curvature of the crown of a tire and be free from folds and creases when applied, an endless coiled spring connected to the inner edge of the attaching strip and adapted to maintain the first named piece of material and said attaching strip taut and free from creases and folds, the ends of the attaching strip being free and overlapped whereby to exclude dust and to provide a means whereby water may be discharged, said spring forming a means to hold the ends of said strip taut and in overlapping relation.

2. As an article of manufacture, a tire cover comprising a disk-shaped piece of flexible material, an attaching strip connected at its outer edge to the edge portion of said piece of material, an endless coiled spring connected to the inner edge of the attaching strip and adapted to maintain the first named piece of material and said attaching strip taut and free from creases, the ends of the attaching strip being free and overlapped to exclude dust and to provide a water discharge means, said spring forming a means to hold the ends of said strip taut and in overlapping relation.

3. As an article of manufacture, a tire cover comprising a flexible piece of material of circular outline, an attaching strip connected at its outer edge to the edge portion of said piece of material, an endless coil spring connected to the inner edge of said attaching strip and adapted to maintain the first named piece of material and said attaching strip taut and free from creases, the ends of said attaching strip being free from permanent connection with each other and being adjacent each other to exclude dust and to provide a water discharge means, said spring forming means to hold the ends of said strip taut and adjacent each other.

EUGENE EDWIN BIGELOW.
PEARL THOMPSON.